United States Patent
Heinrichs

[11] Patent Number: 5,933,615
[45] Date of Patent: Aug. 3, 1999

[54] OPTIMIZATION OF THE TRANSFER OF DATA WORD SEQUENCES

[75] Inventor: Hans-Jürgen Heinrichs, Altenbeken, Germany

[73] Assignee: Siemens Nixdorf Informationssysteme Aktiengesellschaft, Paderborn, Germany

[21] Appl. No.: 08/875,956

[22] PCT Filed: Feb. 6, 1996

[86] PCT No.: PCT/DE96/00179

§ 371 Date: Aug. 8, 1997

§ 102(e) Date: Aug. 8, 1997

[87] PCT Pub. No.: WO96/25703

PCT Pub. Date: Aug. 22, 1996

[30] Foreign Application Priority Data

Feb. 15, 1995 [DE] Germany ............ 195 05 095

[51] Int. Cl.⁶ ............................................. G06F 13/14
[52] U.S. Cl. ................... 395/309; 395/306; 395/872; 395/880

[58] Field of Search ................ 395/306, 309, 395/872, 873, 875, 877, 876, 880, 200.63

[56] References Cited

U.S. PATENT DOCUMENTS

| 4,860,193 | 8/1989 | Bentley et al. | 395/875 |
| 5,210,829 | 5/1993 | Bitner | 395/877 |

FOREIGN PATENT DOCUMENTS

0 247 317 A3  2/1987  European Pat. Off. .

*Primary Examiner*—Ayaz R. Sheikh
*Assistant Examiner*—Ario Etienne
*Attorney, Agent, or Firm*—Hill & Simpson

[57] ABSTRACT

Method and arrangement for buffering between two synchronously pulsed devices which transmit and receive data packets of data words, the output being enabled as soon as the number of output clock cycles after the start of a data packet exceeds a start value which is determined in advance by measuring the output clock cycles as a function of the input clock cycles.

14 Claims, 4 Drawing Sheets

OPTIMIZATION OF THE TRANSFER OF DATA WORD SEQUENCES

BACKGROUND OF THE INVENTION

The invention relates to the coupling of data word transfer devices in computer systems, in particular the coupling of different-speed bus systems.

Two bus systems operating at different data rates can be coupled via memory modules called FIFOs, for example the Type 74ALS2233 from Texas Instruments. These modules have a memory with two access paths via which, simultaneously, a transmitter can store data and a receiver can read data. Counters contained in the module are used to output the data in the sequence in which it is stored. In this case, the module provides signals which indicate that the input section is full and that the output section is empty. The former signal is used to stop the transmitter if the receiver has not been able to receive the data sufficiently quickly. The second signal causes the receiver to accept the data. If the transmitter is transmitting the data words in packets in which the data words follow one another more quickly than the receiver can process them, but there is a relatively long pause between data packets from the transmitter, then the receiver can process the data at a medium speed. If the receiver has a higher acceptance rate than the transmitter, a filling level signal for, for example, half-full, is frequently provided. Only when the buffer store is half-full is the receiver started for acceptance, and then accepts data until the buffer store has become empty. In this case, the transmitter and receiver frequently operate in the asynchronous mode, in which the transmitter transmits at times that are not predetermined and the receiver allows a variable length pause between two data words.

In computer systems and, in particular, in the case of access to bus systems, arrangements are used in which data packets comprising a predetermined number of data words are transmitted without interruption, also called the synchronous mode. The FIFO buffer stores mentioned above are also used if the clock rates of the transmitter and receiver differ.

A known application of FIFO memories in synchronous bus systems comprises the entire data packet initially being stored in the buffer store, with the transfer to the receiver being initiated at the end of the data packet, once all the data words are in the memory. However, the transmission rate of this arrangement is considerably less than that of the transmitter or receiver. Because of the synchronous operating mode, in contrast to the asynchronous operating mode, the transmission to the receiver (the data sink) cannot take place until it is certain that the data packet can be sent without interruption. This is undoubtedly the case once the data source has completed the transmission process. The loss of bandwidth in the case of this simple method thus corresponds to the duration of data transmission on the faster bus.

An improvement can be achieved if the outputting to the receiver has already started even though the transmitter has not yet transmitted all the data. Since the transmitter transmits continuously, it is possible to determine in advance, for a predetermined transmission and reception clock rate, the buffer store filling level beyond which the transmission to the receiver can be started. The calculation of the filling level in this case has to assume the worst-case boundary conditions, that is to say, if the transmitter is slow in comparison with the receiver, the slowest input clock rate and the fastest output clock rate. If the input clock rate is higher than the assumed slowest input clock rate, then the output to the receiver starts later than the optimum time. This results in lost waiting time or a delay for the transmitter between two data packets.

For example, if a central processor unit is being operated on a peripheral bus, the clock rate on the bus from the transmitter can be changed. The buffer store must then be designed for the slowest peripheral, as a result of which faster peripherals cannot achieve the maximum data packet repetition frequency and are thus not connected optimally.

European Patent Specification EP 0 247 317 specifies a method for coupling a fast channel to a slow channel, in which the data transfer starts when a threshold value is reached which is set on the basis of previous transfers.

SUMMARY OF THE INVENTION

The object of the invention is thus to operate a buffer store in systems where data packets are transmitted continuously, such that virtually delay-free transmission is achieved even if the clock rates differ.

The invention uses a measurement and calculation circuit in which the output clock rate is related to the input clock rate, and a start value in output clock cycles is determined in this way. To this end, the number of output clock cycles during a known number of input clock cycles is determined, is divided by the number of data packets corresponding to the number of input clock cycles, one is added and the data packet length is subtracted. The resultant value represents the number of output clock cycles which must pass after the start of transmission before transmission to the receiver can start.

The invention is thus a method and an arrangement for buffering between two synchronously clocked devices which transmit and receive data packets of data words, the output being enabled as soon as the number of output clock cycles after the start of a data packet exceeds a start value which is determined in advance by measuring the output clock cycles as a function of the input clock cycles.

In the preferred application, the number of data words per packet and the number of measured input clock cycles are in this case a power of two, as a result of which the multiplications and divisions can be achieved by circuitry, and can be achieved easily even with highspeed bus systems.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENT

Figure 1:
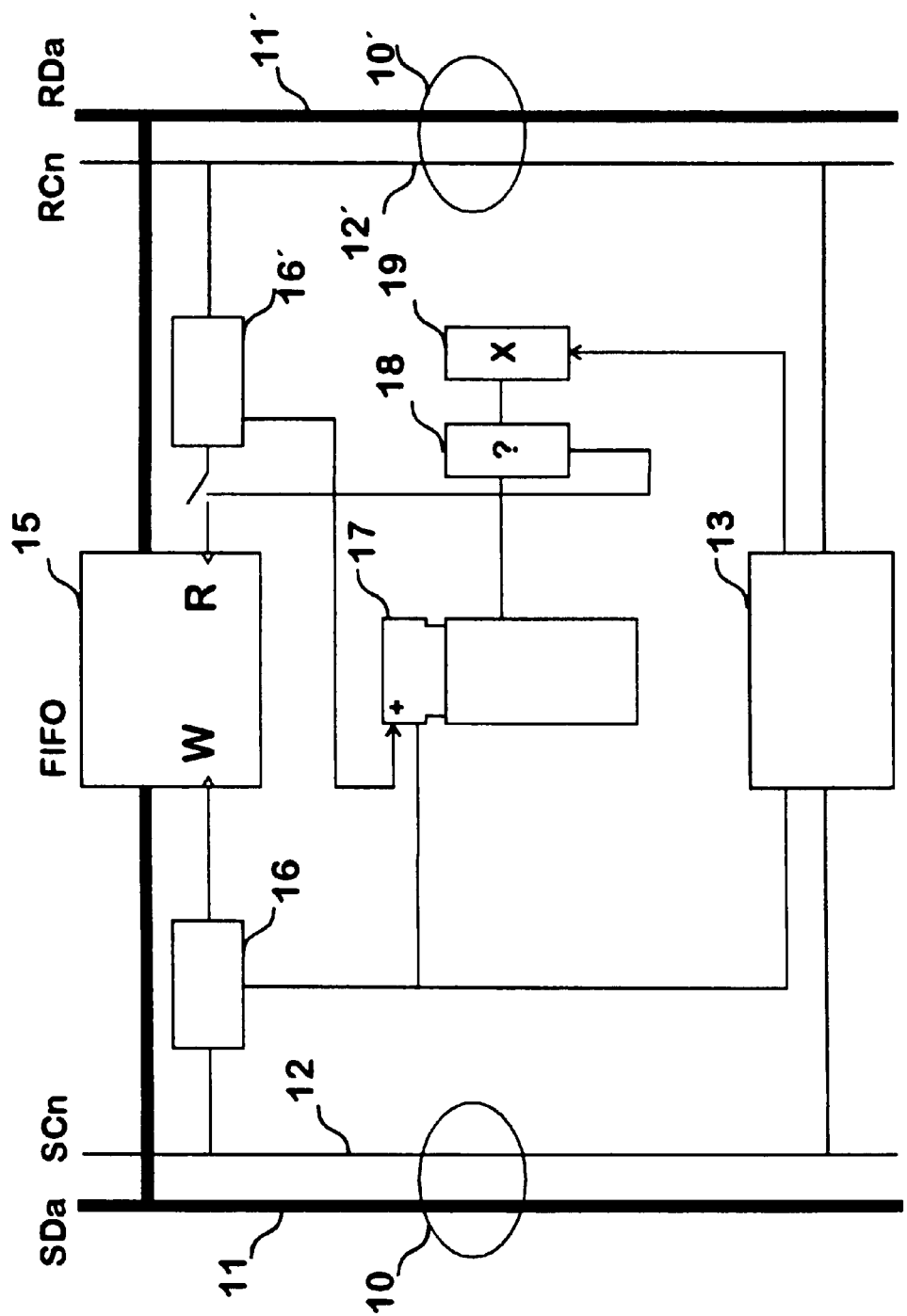
FIG. 1 shows a circuit for coupling a data source to a data sink.

FIG. 1 shows a circuit for transmitting data packets between two bus systems. A data source, which is not illustrated for the sake of clarity, uses a bus system 10 with a source data line section 11 (SDa) and associated control lines 12 (SCn). The data sink likewise uses a bus system 10' with data lines 11' (RDa) and control lines 12' (RCn). A buffer store 15 (FIFO) of a known type, for example Type 74ALS2233 from Texas Instruments, is connected both to the source data lines 11 and to the destination data lines 11'. The signals on the control lines 12 are used by a drive circuit 16 to produce a signal for the buffer store 15, this signal being applied to the acceptance input W of said buffer store 15, and signals for the control circuit 13, which are described in more detail further below. A further drive circuit 16' produces the acceptance signal for reading from the buffer store 15, and is thus connected to its input R. At the same time, it produces the bus control signals for the control lines 12' of the bus system 10' for the data sink.

In the following text, it will always be assumed that the bus systems operate synchronously, to the extent that the clock signals are present uniformly and continuously. It is furthermore assumed that the data transmission takes place in packets, and thus that a plurality of data words are produced with successive clock signals of the bus systems, said data words having a number of bits which does not exceed the number of data lines. In this case, as a rule, the clock signals of the bus systems are neither at the same frequency nor do they have a fixed mutual phase relationship, and it is necessary to take account of this when interpreting the figures.

Figure 2:
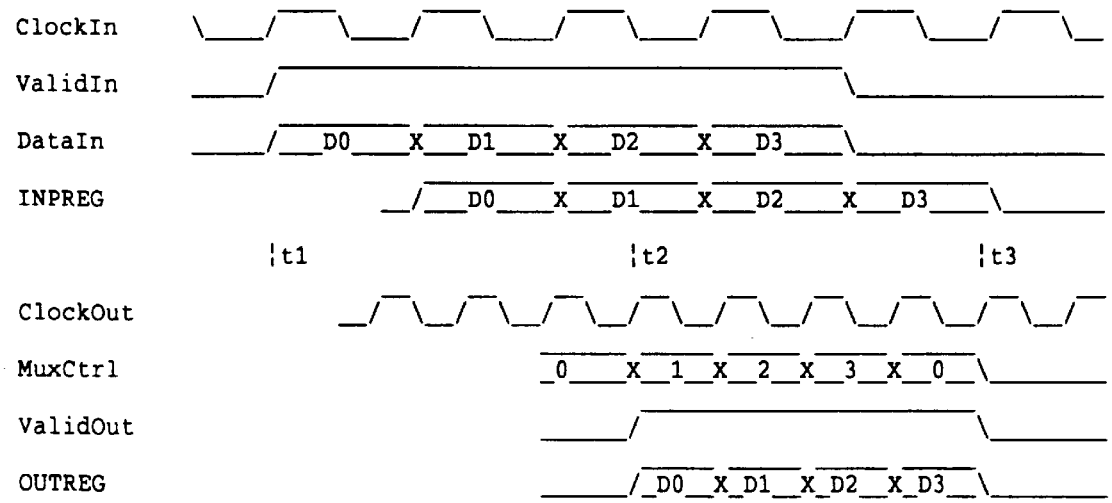
FIG. 2 shows a signal diagram for data transfer using the circuit according to FIG. 1.

Optimal operation of this bus coupling arrangement is illustrated in FIG. 2, the assumption being made that the transmitter is slower than the receiver. The clock signals 12 (SCn), which also determine the transmission clock ClockIn, are used to confirm that a data packet of four data words D0, D1, D2, D3 is to be transmitted at the time $t_1$, this being indicated by the signal ValidIn. The data words are transferred into the buffer store with the four immediately following clock cycles. The signal DataIn represents the data on the bus 10 of the data source, and the signal INPREG represents the data in the buffer store FIFO. Ideally, the data transfer to the data sink does not start until the time $t_2$, which is chosen to be sufficiently late that both data transfers are completed at the time $t_3$. The signal ClockOut represents the clock, the signal Validout the control signal and the signal OutReg the data on the bus 10' of the data sink.

Figure 3:
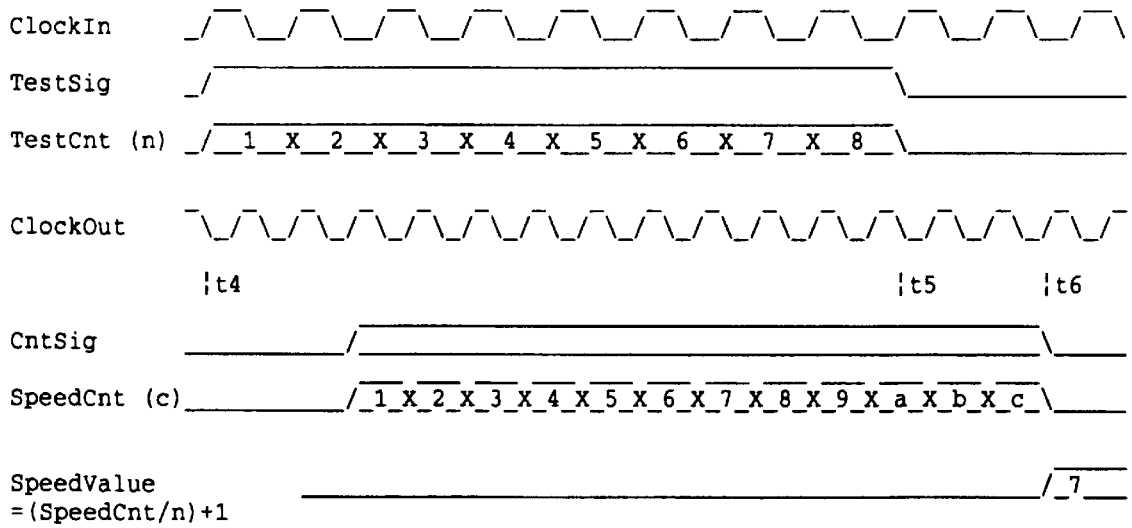
FIG. 3 shows a signal diagram for determining the start value with the circuit according to FIG. 1.

The measurement to determine the optimum starting time is illustrated in FIG. 3. The signal ClockIn once again represents the clock on the bus of the data source which, because operation is synchronous, is present continuously without any data transfer taking place in this case. The bus is thus already in the synchronous mode, in which the clock ClockIn occurs at equidistant time intervals and the frequency is that at which the subsequent data transfers will also take place. If the clock rates are changing, the controller 13 thus internally produces a signal which represents the synchronized state of the bus 10, and is not illustrated. A measurement signal TestSig is now produced from this signal, is synchronized to the input clock ClockIn and lasts for a predetermined number n of clock pulses. In principle, this number n is freely variable; however, the following steps can be implemented more easily if it is a multiple of the number of data words per data packet. This number of data words per data packet can on the one hand be determined during the design phase of the computer system, during which it is generally possible to tell which data packets will occur frequently. It can also be determined dynamically during operation. If more than one packet length can be expected, the lowest common multiple can also expediently be used as the multiple. In the majority of computers, the data packet length is a power of two. A suitable value for the number n is thus 8 or 16.

During the time of the measurement signal TestSig, which time is determined by the number n, the number of clock cycles on the receive bus 10' are counted. The signal TestSig thus represents the enable signal for a counter whose count input is connected to the clock signal of the bus 10' of the data sink. In the example in FIG. 3, a number n=8 was chosen and a number c=12 of clock cycles were counted on the receive bus 10', represented by the signal SpeedCnt in FIG. 3.

In a first embodiment, the number obtained in this way is divided directly by the number of data packets per measurement interval, in the example in FIG. 2, this is the number 8 divided by 4 equal to 2; in the example, this gives the number 6. The division with truncation by 2 can be carried out in a known simple manner by circuitry. In order to compensate for the error caused by the phase difference between the two bus clocks, this number is also incremented by one. Greater summands are possible, but in general are not optimum. This increased number, in the example the number 7, is then stored in a resister. The measurement can also initially be unchanged in a register, and can later be divided by the number of clock cycles per data block and incremented by one, if different block sizes can occur with the clock rate unchanged.

Figure 4:
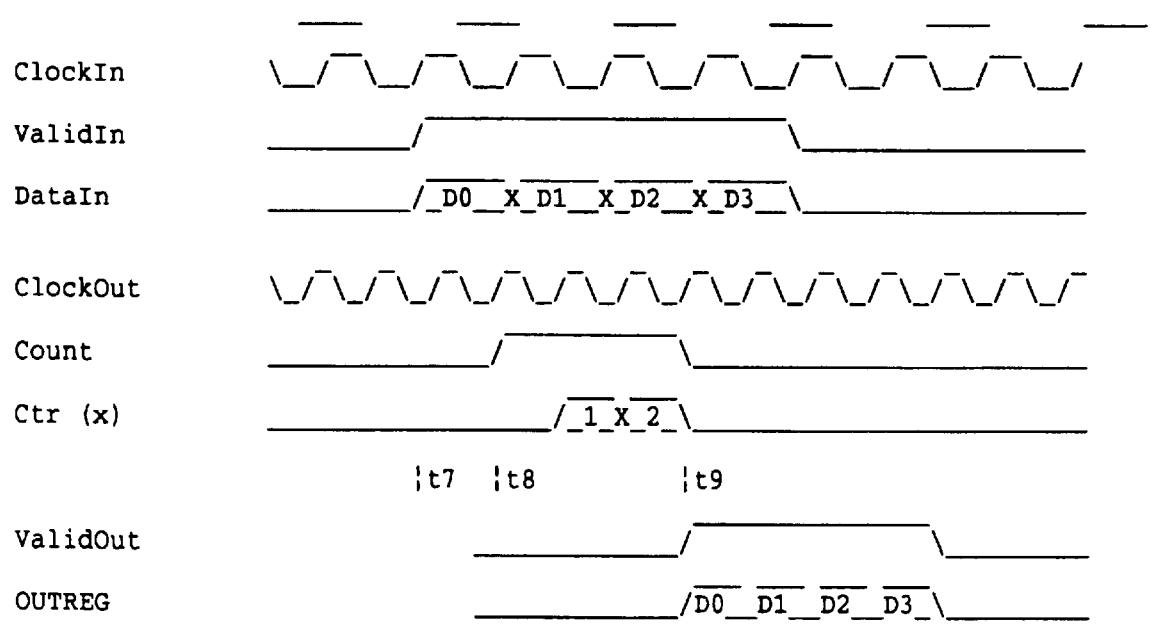
FIG. 4 shows a signal diagram for data transfer using the circuit according to FIG. 1 in accordance with the invention.

A data transfer following the described measurement phase is illustrated in FIG. 4. The start of transmission, that is to say of the data transfer on the input bus 10, is represented by the activation of the signal ValidIn. The next-but-one output clock pulse transfers the signal ValidIn and thus produces the signal Count which enables a counter which counts the number of clock cycles on the bus 10 for the data sink. Once this counter 17 has reached the determined delay value x, which has been determined in advance as the difference between the value determined in the measurement phase according to FIG. 2 and the number of data words per data block to be transmitted, the signal ValidOut is produced and causes the data to be transmitted from the buffer store 15, by means of the bus 10', to the data sink.

Figure 5:
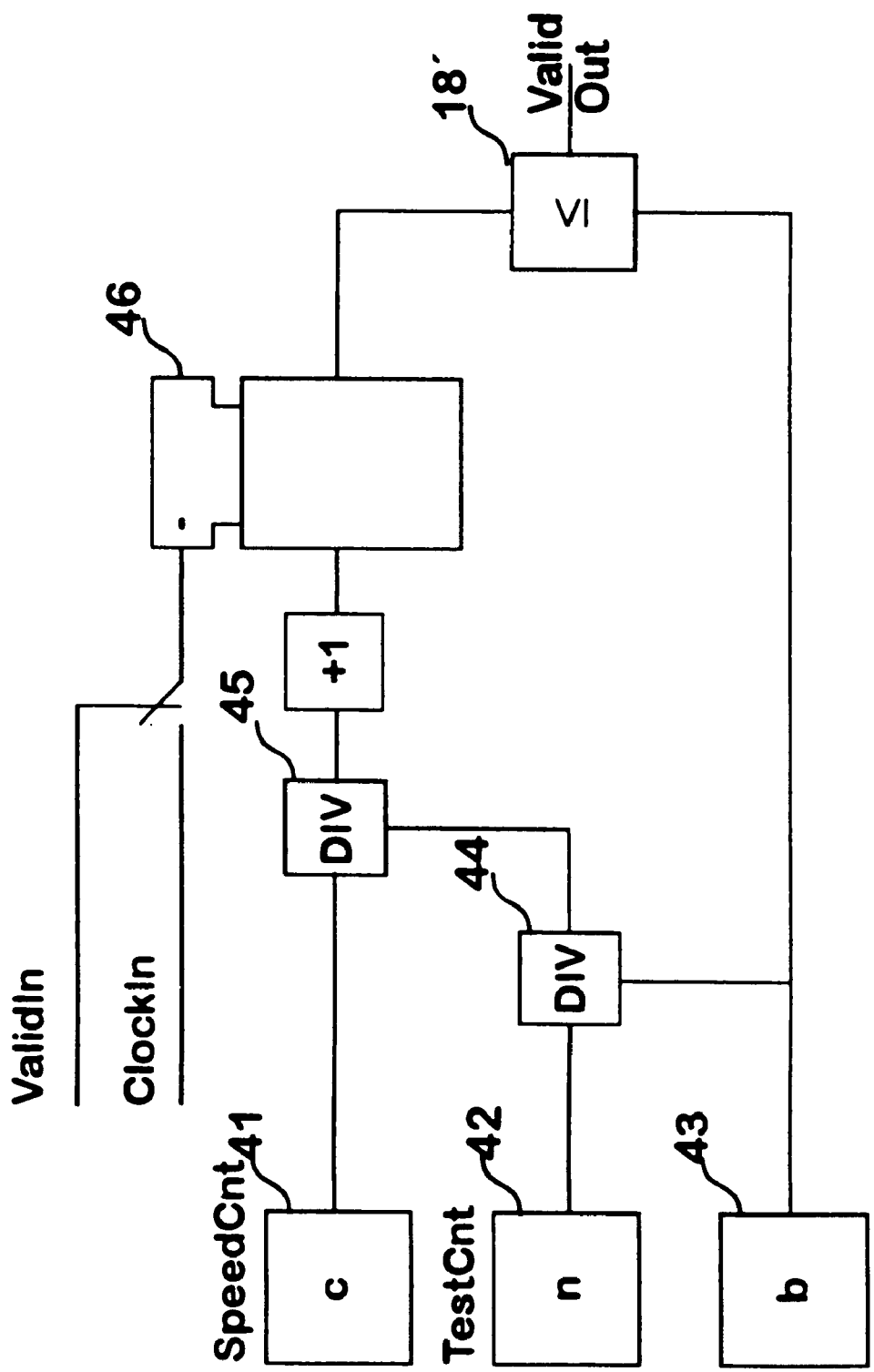
FIG. 5 shows an alternative circuit for part of FIG. 1.

FIG. 5 shows an alternative circuit for producing the waiting time between the start of transmission by the transmitter (t1) and the start of transmission to the receiver (t2). In this case, the counter 17 is replaced by a step-down counter 46 and the comparison 18 by a comparison 18' of the status of the step-down counter 46 with the number of data words per data block, this number being stored in a register 43. First of all, in the same way as until now, the number n of clock cycles preset for the measurement (register 42) on the bus 10 of the data source is divided by the number b of data words per data block (register 43). If the latter is a power of 2, then the division is carried out by a multiplexer which acts as a shift register. Otherwise, with the small number of questionable numbers, division can also be carried out by addressing a read only memory in which the dividend and divisor together represent the address of the read only memory, and the stored data word outputs the quotient, if necessary rounded. This quotient n/b obtained in this way is used as the divisor for a second division, in which the measured number c (register 41) is divided by the quotient n/b. Once again, a multiplexer or a read only memory must be provided, depending on the boundary conditions. The quotient is incremented by one. This result, which is called SpeedValue in FIG. 2, is now loaded directly into the step-down counter 46 which, when the transfer from the data source starts, is decremented by the clock of the other, namely the bus of the data sink. The count is compared with the number of data words per data block. As long as the count is greater, the transfer to the data sink remains inhibited. If it is equal or less, the transfer to the data sink is enabled. It is then irrelevant whether this transfer starts immediately or is still delayed because of a blockage at the data sink. This arrangement in any case ensures that the earliest time from which the data transfer to the data sink is possible is determined safely and is close to the optimum value, even at high bus speeds.

A technically equivalent option to the addition of the constant 1 after the division is to preload the counter with the divisor or the divisor The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for matching speed of transfer of packets of data words between a data source and a data sink, the data source being slower than the data sink, comprising the steps of:

producing, using the data source, packets of data words which are read to a buffer store by an input clock and which are output to the data sink by an output clock;

transferring the data words in a packet using directly successive clock cycles not only while reading to the buffer store but also while outputting from the buffer store;

determining a number c of output clock cycles for a predetermined number n of input clock cycles by counting down input clock cycles;

enabling outputting of a packet with a packet length of b data words from the buffer store to the data sink when the number of output clock cycles after the start of transmission by the data source reaches a comparison value x which is given by the formula $x=c/(n/b)-b+e$ e being a constant which is preferably preset to e=1.

2. The method as claimed in claim 1, wherein the term $c/(n/b)+e$ is formed such that, instead of the addition of e, counting down of the input clock cycles does not start at zero but at an initial value which, except for an additive constant, is equal to the divisor n/b of the term.

3. The method as claimed in claim 1, wherein the comparison value x is determined before a start of transfer of data words from the data source.

4. The method as claimed in claim 1, wherein a step-down counter is loaded with a value of the term $c/(n/b)+e$, is reduced by the output clock after a start of data transmission by the data source, and is compared with the packet length b.

5. The method as claimed in claim 1, wherein, the number c of the output clock cycles for a predetermined number n of input clock cycles is determined in that n input clock cycles are counted down to produce a test signal from which, by transfer using the output clock cycles, a counter signal is produced which enables a counter for the output clock cycles, whose result is the number c.

6. An arrangement for matching speed of transfer of packets of data words between a data source and a data sink, the data source being slower than the data sink, comprising:

a buffer store connected to a data source and to a data sink via respective data lines and control lines, the control lines of the data source producing an input clock, and a controller producing an output clock for the control lines of the data sink;

each of the data source and the data sink respectively transmitting and receiving blocks of data words with directly successive clock signals;

a measurement circuit connected to the input clock and to the output clock;

the measurement circuit determining a number c of output clock cycles for a predetermined number n of input clock cycles, the measurement circuit outputting he number c on an output of the measurement circuit;

the output of the measurement circuit connected to a first input of a calculation circuit, and the control circuit connected to a second input of the calculation circuit, via which second input a number of data words b to be transmitted is provided, and which calculation circuit provides at an output a value which contains the summand $c/(n/b)$;

the output of the calculation circuit connected to the control circuit, which is designed such that, irrespective of the value provided by the measurement circuit, data transfer from the buffer store to the data sink is enabled when a number x of output clock cycles after the start of transmission by the transmitter satisfies the equation $x=c/(n/b)-b+e$ e being a constant which is preferably preset as e=1;

whereby the arrangement is used for:

producing, using the data source, packets of data words which are read to the buffer store by an input clock and which are output to the data sink by an output clock;

transferring the data words in a packet using directly successive clock cycles not only while reading to the buffer store but also while outputting from the buffer store;

transferring the number c of output clock cycles for a predetermined number n of input clock cycles by counting down input clock cycles;

enabling outputting of a packet with a packet length of b data words from the buffer store to the data sink when the number of output clock cycles after the start of transmission by the data source reaches a comparison value x which is given by the formula $x=c/(n/b)-b+e$ e being a constant which is preferably preset to e=1.

7. The arrangement as claimed in claim 6, wherein a value of the term $c/(n/b)+e$ is formed in that, instead of the addition of e, a counting down of the input clock cycles does not start at zero but at an initial value which, except for an additive constant, is equal to the divisor n/b of the term.

8. The arrangement as claimed in claim 6, wherein the number x is determined before a start of transfer of data words from the transmitter.

9. The arrangement as claimed in claim 6, wherein the arrangement further comprises a step-down counter connected at one input to the calculation circuit, which provides a value of the term c/(n/b)+e which is loaded via a signal which indicates a start of transfer of data words by the data source, and wherein the step-down counter is connected via an enable circuit to the output clock, such that the output clock reduces the value when the enable circuit indicates a start of transfer of data words by the data source, and wherein the output of the step-down counter is compared in a comparator with the packet length b, and wherein an output of the comparator is connected to controllers which enable transfer of data words to the data sink when the content of the step-down counter has reached the packet length b.

10. The arrangement as claimed in claim 6, wherein, the measurement circuit has a first counter, which counts down the predetermined number n of input clock cycles and thus provides a count signal which is accepted by the output clock and is thus brought into phase with the output clock, the first counter being connected to an enable input of a second counter which counts the output clock cycles for a duration of an in-phase count signal, and the second counter passing on, in particular by presetting an initial value of one, the number of output clock cycles plus one as the count c to the calculator circuit.

11. A method for matching speed of transfer of packets of data words between a data source and a data sink, the data source being slower than the data sink, comprising the steps of:
producing, using the data source, packets of data words which are read to a buffer store by an input clock and which are output to the data sink by an output clock;
transferring the data words in a packet using directly successive clock cycles not only while reading to the buffer store but also while outputting from the buffer store;
determining a number c of output clock cycles for a predetermined number n of input clock cycles by counting down input clock cycles;
enabling outputting of a packet with a packet length of b data words from the buffer store to the data sink when the number of output clock cycles after the start of transmission by the data source reaches a comparison value x which is given by the formula $$x = c/(n/b) - b$$

the term c/(n/b) being formed such that counting down of the input clock cycles starts at an initial value which, except for an additive constant, is equal to the divisor n/b of the term.

12. The method as claimed in claim 11, wherein the comparison value x is determined before a start of transfer of data words from the data source.

13. The method as claimed in claim 11, wherein a step-down counter is loaded with a value of the term c/(n/b), is reduced by the output clock after a start of data transmission by the data source, and is compared with the packet length b.

14. The method as claimed in claim 11, wherein, the number c of the output clock cycles for a predetermined number n of input clock cycles is determined in that n input clock cycles are counted down to produce a test signal from which, by transfer using the output clock cycles, a counter signal is produced which enables a counter for the output clock cycles, whose result is the number c.

* * * * *